United States Patent
Jeddeloh

(12) 
(10) Patent No.: US 6,622,228 B2
(45) Date of Patent: *Sep. 16, 2003

(54) SYSTEM AND METHOD OF PROCESSING MEMORY REQUESTS IN A PIPELINED MEMORY CONTROLLER

(75) Inventor: Joseph Jeddeloh, Minneapolis, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/931,728

(22) Filed: Aug. 16, 2001

(65) Prior Publication Data

US 2002/0013888 A1 Jan. 31, 2002

Related U.S. Application Data

(63) Continuation of application No. 09/127,282, filed on Jul. 31, 1998, now Pat. No. 6,295,592.

(51) Int. Cl.[7] .............................................. G06F 12/00
(52) U.S. Cl. .................... 711/169; 711/168; 711/105
(58) Field of Search ................................ 711/169, 167, 711/105, 160, 168, 111, 5; 712/215; 365/670

(56) References Cited

U.S. PATENT DOCUMENTS

| | | | | |
|---|---|---|---|---|
| 4,295,193 A | | 10/1981 | Pomerene | |
| 4,697,233 A | * | 9/1987 | Scheuneman et al. | 711/169 |
| 5,537,555 A | | 7/1996 | Landry et al. | |
| 5,956,744 A | * | 9/1999 | Robertson et al. | 711/122 |
| 6,018,798 A | * | 1/2000 | Witt et al. | 711/2 |
| 6,032,252 A | | 2/2000 | Petro et al. | |
| 6,157,988 A | * | 12/2000 | Dowling | 711/125 |
| 6,272,609 B1 | * | 8/2001 | Jeddeloh | 711/105 |
| 6,295,592 B1 | * | 9/2001 | Jeddeloh | 711/168 |
| 6,353,880 B1 | * | 3/2002 | Cheng | 712/200 |
| 6,408,377 B2 | * | 6/2002 | Munson | 712/215 |
| 2001/0039606 A1 | * | 11/2001 | Jeddeloh | 711/169 |
| 2002/0013888 A1 | * | 1/2002 | Jeddeloh | 711/169 |

* cited by examiner

*Primary Examiner*—Matthew Kim
*Assistant Examiner*—Matthew D. Anderson
(74) *Attorney, Agent, or Firm*—Knobbe, Martens, Olson & Bear, LLP

(57) ABSTRACT

A method for processing multiple memory requests in a pipeline. Each memory request is processed in part by a plurality of stages. In a first stage, the memory request is decoded. In a second stage, the address information for the memory request is processed. In a third stage, the data for the memory request is transferred. A request buffer is used to hold each of the memory requests during the processing of each of the memory requests.

20 Claims, 7 Drawing Sheets

SYSTEM AND METHOD OF PROCESSING MEMORY REQUESTS IN A PIPELINED MEMORY CONTROLLER

RELATED APPLICATIONS

This application is a continuation application of U.S. Patent Application Ser. No. 09/127,282, titled "Method of Processing Memory Requests In A Pipelined Memory Controller", filed Jul. 31, 1998, now U.S. Pat. No. 6,295,592, issued Sep. 25, 2001, which is hereby incorporated by reference in its entirety. This application is also related to U.S. patent application No. 09/127,207, titled "Pipelined Memory Controller," filed Jul. 31, 1998, now U.S. Pat. No. 6,272,609, issued Aug. 7, 2001, and U.S. patent application Ser. No. 09/908,784, titled, "Pipelined Memory Controller," filed Jul. 18, 2001, now U.S. Pat. No. 6,449,703, issued Sep. 10, 2002.

BACKGROUND OF THE INVENTION

1. Field of the Invention

The invention relates generally to memory controllers and more particularly to a method for processing memory requests in a memory controller.

2. Description of the Related Technology

A computer system relies on memory to store instructions and data that are processed by a computer system processor. Breathtaking advances have been made in both the storage capacity and speed of computer memory devices. However, the speed increases of memory devices have not been able to keep pace with the speed increases achieved with current microprocessors. As a result, the speed of current computer systems is limited by the speed in which the data instructions can be accessed from the memory of the computer system.

The typical memory contains an array of memory cells connected to each other by row and column lines. Each memory cell stores a single bit and is accessed by a memory address that includes a row address that indexes a row of the memory array and a column address that indexes a column of the memory array. Accordingly, each memory address points to the memory cell at the intersection of the row specified by the row address and the column specified by the column address.

In a typical computer system, the system processor communicates with the computer memory via a processor bus and a memory controller. For example, a central processing unit (CPU) issues a command and an address which are received and translated by the memory controller. The memory controller, in turn, applies appropriate command signals and row and column addresses to the memory device. Examples of such commands include a row address strobe (RAS), column address strobe (CAS), write enable (WE), and possibly a clock signal (CLK). In response to the commands and addresses, data is transferred between the CPU and the memory device.

The memory device typically includes a dynamic random access memory (DRAM) module such as a single in-line memory module (SIMM) or a dual in-line memory module (DIMM). The memory module typically includes one or more banks of memory chips connected in parallel such that each memory bank stores one word of data per memory address.

In an attempt to decrease memory access time, an even faster form of memory, referred to as synchronous DRAM (SDRAM), was created. SDRAM transfers data with the use of a clock signal. In contrast, typical DRAM devices are asynchronous because they do not require a clock input signal. The memory controller for synchronous devices receives the system clock signal and operates as a synchronous interface with the CPU so that data is exchanged with the CPU at appropriate edges of the clock signal.

SDRAMs offer substantial advances in DRAM operating performance, including the ability to synchronously burst data at a high data rate with automatic column-address generation, the ability to interleave between internal data banks in order to hide precharged time, and the capability to change column in addresses on each clock cycle during a burst access.

Typically SDRAMs are configured to include a pipeline. Pipelining refers to the interlinking or overlapping of input and output data and addresses of consecutive bus cycles. Pipelining increases the throughput of memory transactions. With this pipelined architecture SDRAMs can accept a new column address on every clock cycle.

As the speed of memory devices such as the SDRAM increases, other bottlenecks arise within computer systems. For example, as SDRAM devices are operated at faster clock rates, the memory controllers to which they are coupled often cannot exchange data between the CPU and the memory device quickly enough. Therefore, manufacturers have found that the memory controller itself needs to be pipelined.

In view of the above, it is apparent that manufacturers are in need of an efficient pipelined memory controller to facilitate the communication of the memory requests to the memory devices.

SUMMARY OF THE INVENTION

One aspect of the invention comprises a method of processing at least one memory request. The method comprises processing the at least one memory request in a plurality of stages. In a first stage, the at least one memory request is received from a memory requester and stored in a request buffer. In a second stage the at least one memory request is decoded. In a third stage the at least one memory request is sent to a memory module. During the act of processing, each of the first, second and third stages are executed in parallel, and wherein the act of processing includes the act of storing the first and second memory requests in at least one rotational register contained in the request buffer.

Another aspect of the invention includes a method of handling multiple memory requests. The method includes receiving in a memory controller at least two memory requests for digital information for data that resides a memory and concurrently processing the two memory requests.

Yet another aspect of the invention comprises a system comprising at least one memory and a pipelined memory controller. The memory controller is capable of operable controlling the at least one memory and receiving memory requests with respect to the memory. The pipelined memory controller is capable of processing the memory requests in a plurality of concurrently processed pipelined stages.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

System Overview

Figure 1:
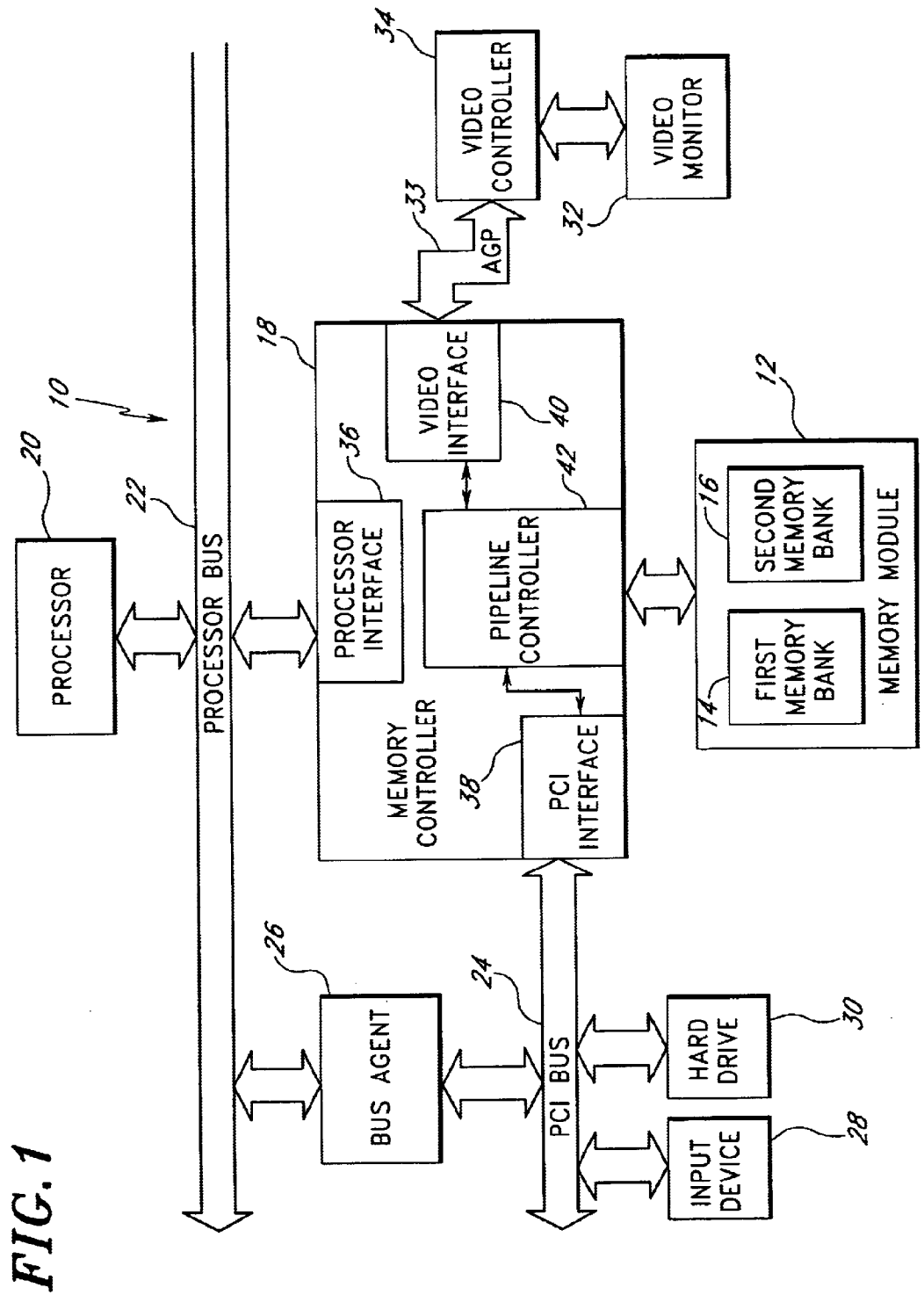
FIG. 1 is a block diagram of one embodiment of a computer system according to the invention.

FIG. 1 illustrates a computer system 10 for processing memory requests for access to a memory module 12 with two memory banks 14, 16. The memory module 12 can be any of numerous types of memory modules, such as a double in-line memory module (DIMM). The memory module 12 includes a set of SDRAM memory chips structured to store data and computer instructions. The memory module 12 can include memory other than SDRAM, such as static random access memory (SRAM) or asynchronous DRAM.

Of course, the memory module 12 can have more or less than the two memory banks 14, 16. The computer system 10 includes a memory controller 18 that controls the manner in which data is written to or read from the memory banks 14, 16 of the memory module 12. The memory controller 18 interfaces the memory module 12 with a computer system processor 20 via a processor bus 22. As is typical, the computer system 10 also includes an extension bus, such as a PCI bus 24, that is coupled to the processor bus 22 by a bus agent 26. Coupled to the extension bus 24 is an input device 28, including such peripherals as a keyboard, mouse, or electronic pen/tablet, and a hard drive 30. The computer system 10 also includes a video monitor 32 coupled to a video controller 34. The video controller 34 is coupled to the memory controller 18 by an accelerated graphics port (AGP) bus 33. The processor 20, input device 28, hard drive 30, and video controller 34, each can be referred to as a memory requester because each can request access to the information stored in the memory module 12.

In addition, the PCI bus 24 can also be referred to as a memory requester because the input device 28, hard drive 30, and any other devices coupled to the PCI bus 24 all require the PCI bus 24 to transfer memory requests to the memory module 12. In one embodiment, the PCI bus 24 and the video controller 34 are coupled directly to the memory controller 18 to allow direct memory access to the memory module 12 by the PCI bus 24 and the video monitor 32 and the video controller 34. Such direct memory access reduces the data that is carried by the processor bus 22, thereby reducing bottlenecks on the processor bus 22 and increasing the speed of communication between the elements of the computer system 10. In particular the memory controller 18 includes a processor interface 36, coupled to the processor 20 via the processor bus 22; a PCI interface 38 coupled to the PCI bus 24; and a video interface 40 coupled to the video controller 34. Each of the interfaces 36, 38, 40 is responsive to respective read and write control signals received from each of the interfaces 36, 38, 40 respective memory requesters 20, 24, 34. The memory controller 18 also includes a pipeline controller 42 which handles all of the read and write requests to the memory module 12.

Figure 2:
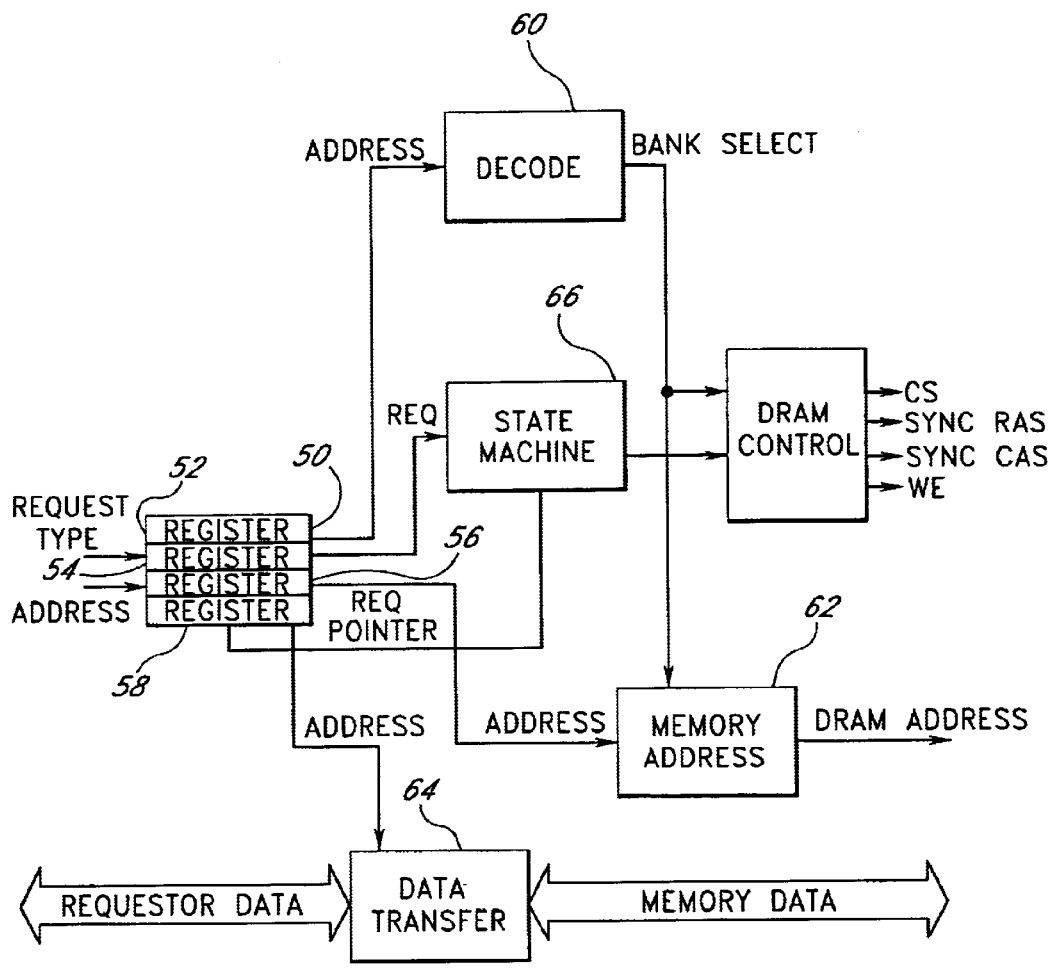
FIG. 2 is a block diagram of the pipeline modules of the memory controller shown in FIG. 1.

Referring to FIG. 2, in conjunction with FIG. 1, some of the features of the pipeline controller 42 are illustrated. The pipeline controller 42 has a request buffer 50. The request buffer 50 has a simple rotational set of request registers 52–58 that hold the address, type of transfer and count for each memory request. The number of registers in the request buffer 50 determines how many outstanding requests may be sent to the memory controller 18. In one embodiment of the invention, four registers are used. However, the request buffer 50 may comprise sets of three to five, two to seven, or one to nine registers as well. The pipeline controller 42 also has a decode module 60, a memory address module 62, a data transfer module 64, and a state machine 66.

Figure 3:
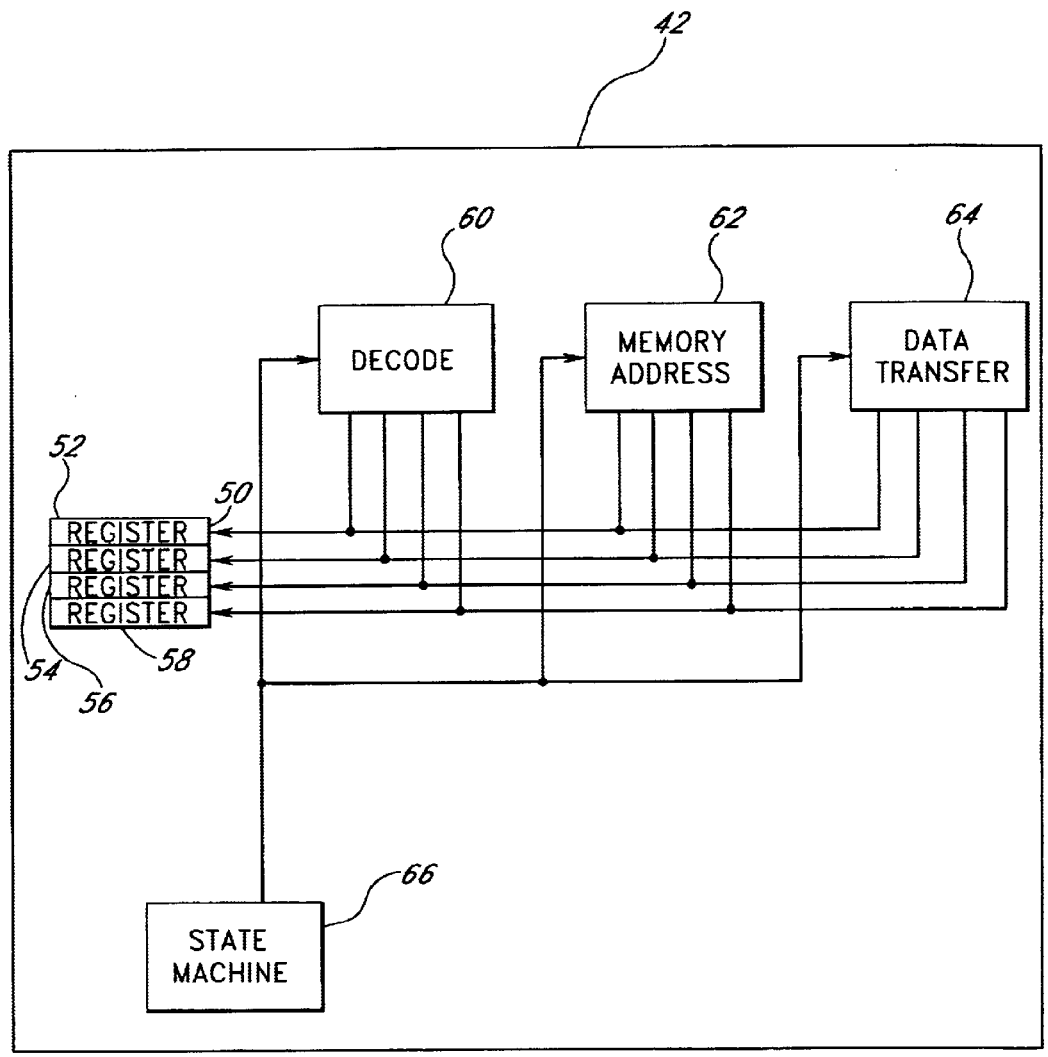
FIG. 3 is a block diagram illustrating some of the signal lines used by the state machine shown in FIG. 2 to update the pointers used by the pipeline modules.

Referring to FIG. 3, it is seen that the decode module 60, the memory address module 62, and the data transfer module 64, all contain a unique pointer to the request buffer 50. The state machine 66 controls the pointer updates for decode module, the memory address module 62, and the data transfer module 64. The function and operation of each of the modules 60–64 will be described in greater detail below.

Method of Operation

The pipeline controller 42 uses a pipelined approach to handling a memory request from each of the memory requesters. Each stage in the pipeline is handled by one of the modules 60–64 in the pipeline controller 42. The pipelined approach provides for the simultaneous processing of multiple memory requests. In the embodiment of the invention illustrated in FIG. 2, a three stage pipeline is shown. Each stage of the pipeline is handled by one of the modules 60–64, respectively. In a first stage, the decode module 60 determines whether or not the first memory request was a page hit or a miss, the type of memory that had been requested, which of the memory banks 14, 16 is to be addressed, and the error correction or detection method to be used. In a second stage, the memory address module 62 sends the row and address information of the memory request to the memory. In a third stage, the data transfer module 64 handles the transmission of the data to or from the memory module 12. The decode module 60 and the memory address module 62 may process the same memory request independently of each other. However, the data transfer module 64 needs to wait for the appropriate information to be transferred to the memory module 12 before sending or receiving the data for a memory request.

It is noted that the number of stages in the state machine 66 may be increased or reduced. For example, a larger pipeline may be implemented by increasing the number steps. The decode stage can be divided into multiple steps. The pipeline controller 42 can have a pipelined stage for each of the major processes in the decode module 60, the memory address module 62 and the data transfer module 64. If the number of stages is increased, the amount of time for each stage is reduced. The state machine 66 will control which phase of a memory cycle is active for each of these phases. Additionally, the state machine 66 will determine when each of the pipeline modules 60–64 pointers are to be incremented.

Figure 4:
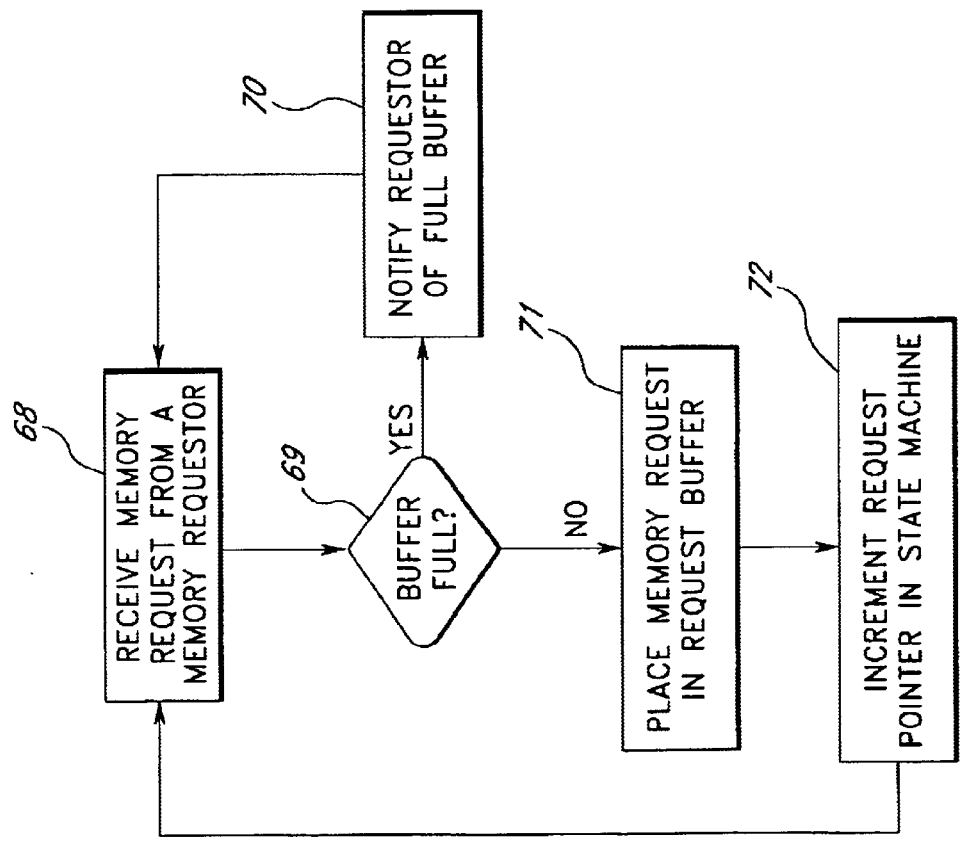
FIG. 4 is a flow diagram illustrating the memory receiving process of the request buffer shown in FIGS. 2 and 3.

Referring to FIG. 4, the receiving process for the request buffer 50 is illustrated. The request buffer 50 holds and queues each of the memory requests for processing for later use by each of the pipeline modules 60–64. Starting at a state 68, the memory controller 18 receives a first request. Moving to a decision state 69, the memory controller 18 determines whether the request buffer 50 is full. If the request buffer 50 is full, the memory controller in a state 70 notifies the memory requestor that the request buffer is full. No further requests can be received until one of the memory requests in the request 50 is fully processed. Otherwise, if the request buffer 50 is not full, in a state 71, the memory controller 18 places the memory request in one of the registers 52–58. Moving to a state 72, the memory controller 18 increments the request pointer to reference the new memory request. The memory controller 18 returns to the state 68 to process further memory requests.

Figure 5:
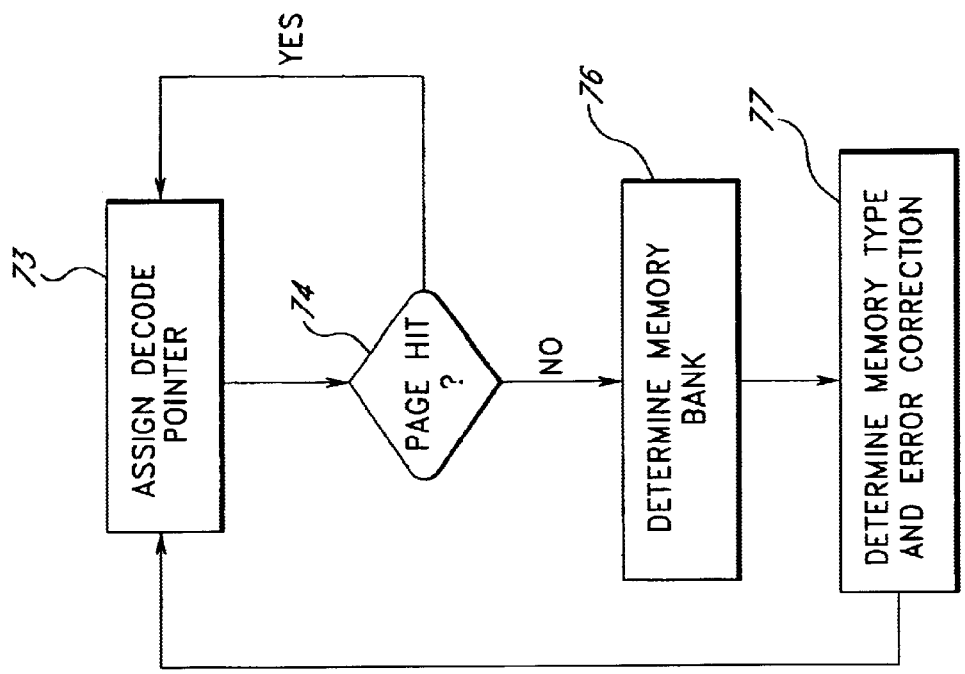
FIG. 5 is a timing diagram of the pipeline components of the memory controller shown in FIG. 1.

Now referring to FIG. 5, the process by which the decode module 60 performs the initial processing for a memory request is described. Starting at a state 73, the state machine 66 assigns the decode pointer to reference the proper memory request in the request buffer 50. Then, in state 74, the decode module 60 determines whether or not the memory request is a page hit or a miss. If the memory request is a hit, the memory reference is of a same type as a previous memory reference. Therefore, no additional decoding is performed and the process flow returns to the state 73. However, if the memory request is a miss, the process proceeds to a state 76. At the state 76, the address of the memory request is compared to a set of bank address registers to determine a bank number for the appropriate memory bank. The bank number is used to reference a plurality of bank descriptor registers. Proceeding to a state 77, the bank desriptor registers are used to determine the memory type of the memory request and the type of error correction that are to be applied upon accessing the memory. The decode module 60 can be programmed to use any of the error correction or detection methods that are known in the art. The process flow then returns to the state 73 to perform additional decoding. The operation of the page hit/miss determination, the bank address comparison, and the bank descriptor lookup may take one or more clock cycles depending on the clock speed of the computer system 10.

The results of this processing are then saved for use by the other modules 62–64. Upon completion of the decode processing, the state machine 66 increments the decode pointer to the request buffer 50. The decode module 60 now processes the next memory request, if any, in the request buffer 50.

Figure 6:
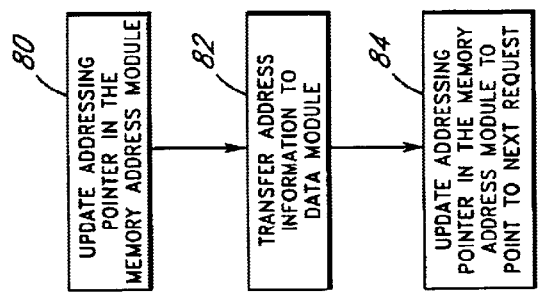
FIG. 6 is a flow diagram illustrating the pipeline process for the state machine shown in FIG. 3.

Referring to FIG. 6, the states of the second stage of the pipeline are described. The second stage of the pipeline process involves memory addressing. Similar to the decode pointer in the decode module 60, the memory address module 62 has an addressing pointer referencing a memory request in the request buffer 50. Starting at a state 80, the state machine 66 updates the addressing pointer. The addressing pointer indicates to the memory address module 62 which memory request needs to be processed. Next, in state 82, the memory address module 62 asserts the row address strobe (RAS) and the column address strobe (CAS) and sends to the memory module 12 the row and column address, respectively, for the address referenced by the addressing pointer. Once the memory address module 62 is complete, the addressing pointer is updated in state 84 so that it points to the next memory request.

Figure 7:
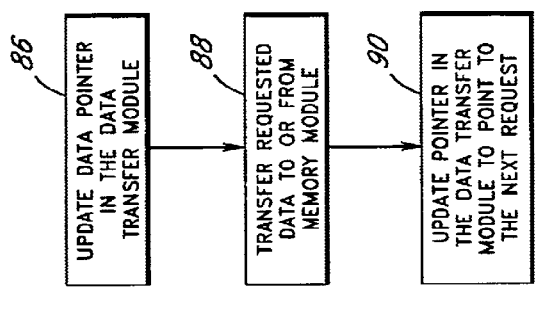
FIG. 7 is a flow diagram illustrating the data transfer process of the data transfer module shown in FIGS. 2 and 3.

FIG. 7 illustrates the third stage of the pipeline. The third stage is the data phase which is handled by the data transfer module 64. The data transfer module 64 has a data pointer which references the memory request in the request buffer 50 which is to be processed. In state 86, the data pointer is updated by the state machine 66. The data transfer module 64 then transfers the data to the memory module 12 in state 88. The amount of buffering in the memory controller 18 determines how long this stage is active due to CAS latency. CAS latency is the delay, in clock cycles, between the registration of a request command with a memory device and the availability of the first piece of output data. When the data transfer is complete, the data phase pointer is incremented in state 90 by the state machine 66.

Figure 9:
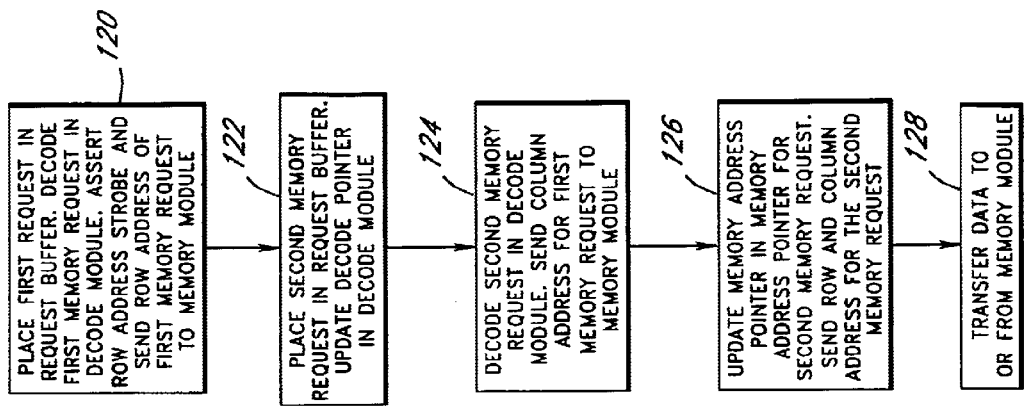
FIG. 9 is a flow diagram illustrating the pipeline process of the memory controller for the timing diagram shown in FIG. 5.
Figure 8:
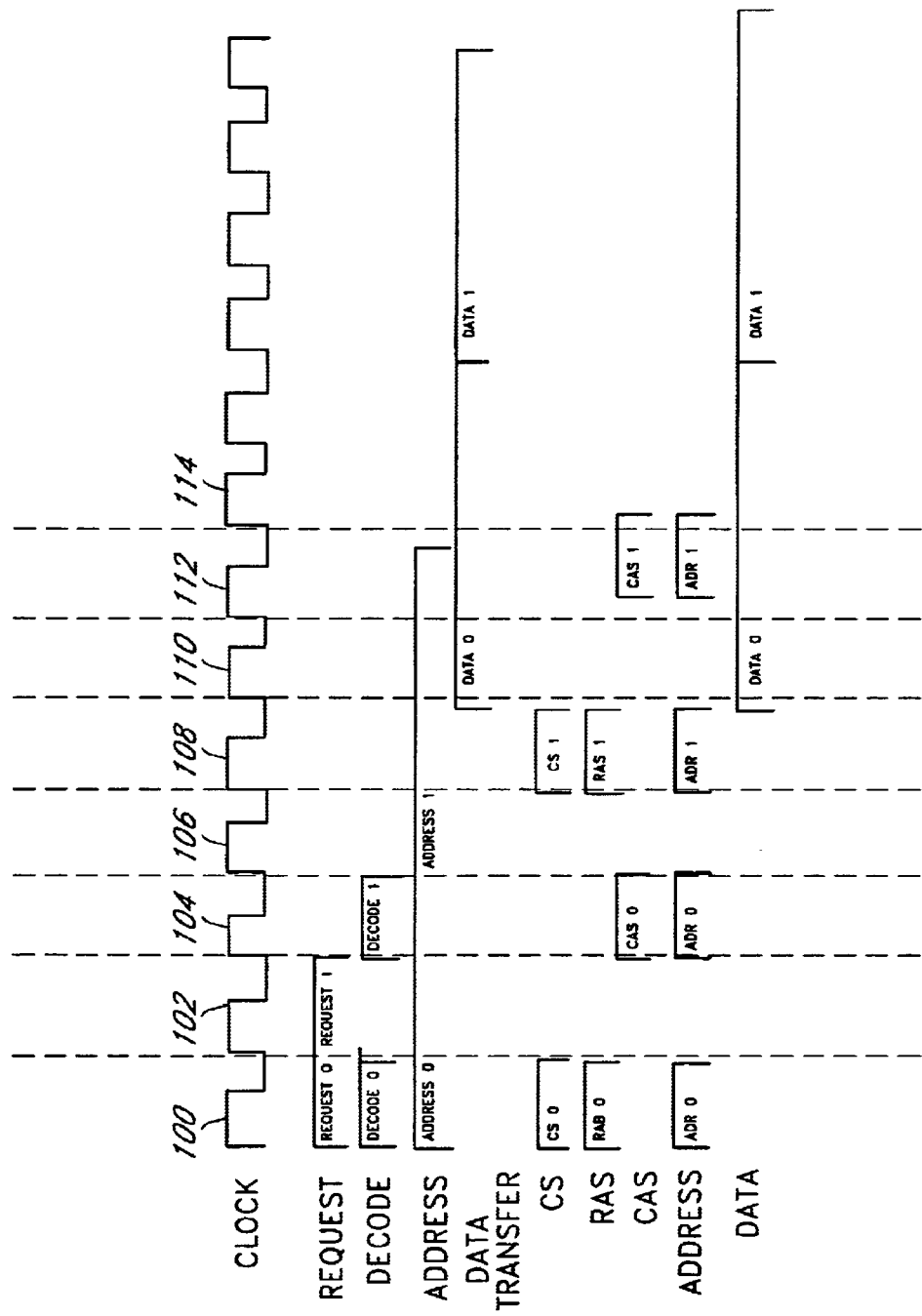
FIG. 8 is a timing diagram of the pipeline components of the memory controller shown in FIG. 1 for two memory requests.

Referring to FIGS. 8 and 9, the processing steps for two memory requests are illustrated. FIG. 8 is a timing diagram illustrating the significant portions of the memory controller 18, and FIG. 9 is a high level flow diagram showing the processing performed by the memory controller 18 for these requests.

Starting at a state 120 (FIG. 9), a first memory request is received by the memory controller 18 (clock cycle 100). The memory controller 18 places the first memory request in the request buffer 50. Since the first memory request is the only request in the queue, the memory controller 18 performs the decode and the address functions simultaneously. The decode process is described in greater detail in reference to states 73–77; however in summation, the decode module 60 determines whether or not the first memory request was a page hit or a miss, the type of memory that had been requested, which of the memory banks 14, 16 is to be addressed, and the error correction or detection method to be used. The memory address module 62 starts sending the address for the first memory request to the memory module 12. The memory address module 62 asserts the row address strobe and sends the row address to the memory module 12 across an address line.

Next, at a state 122, a second memory request is received (clock cycle 102). The state machine 66 updates the pointer in the decode module 60 to reference the second memory request. Moving to a state 124, the decode module 60 starts processing the second memory request (clock cycle 104). Additionally, the memory address module 62 asserts the column address strobe and sends the appropriate address for the column for the first memory address.

Continuing to a state 126, the state machine 66 updates the pointer in the memory address module 62 to reference the second memory request (clock cycle 106). The memory address module 62 during clock cycles 108–112 sends the memory module 12 the row and column information for the second memory request.

Finally, in state 128, the requested data is received or sent to the memory module 12 (clock cycles 110 and beyond). It is noted that while data is being received from the data module, the memory controller 18 can decode and address subsequent memory requests.

Figure 10:
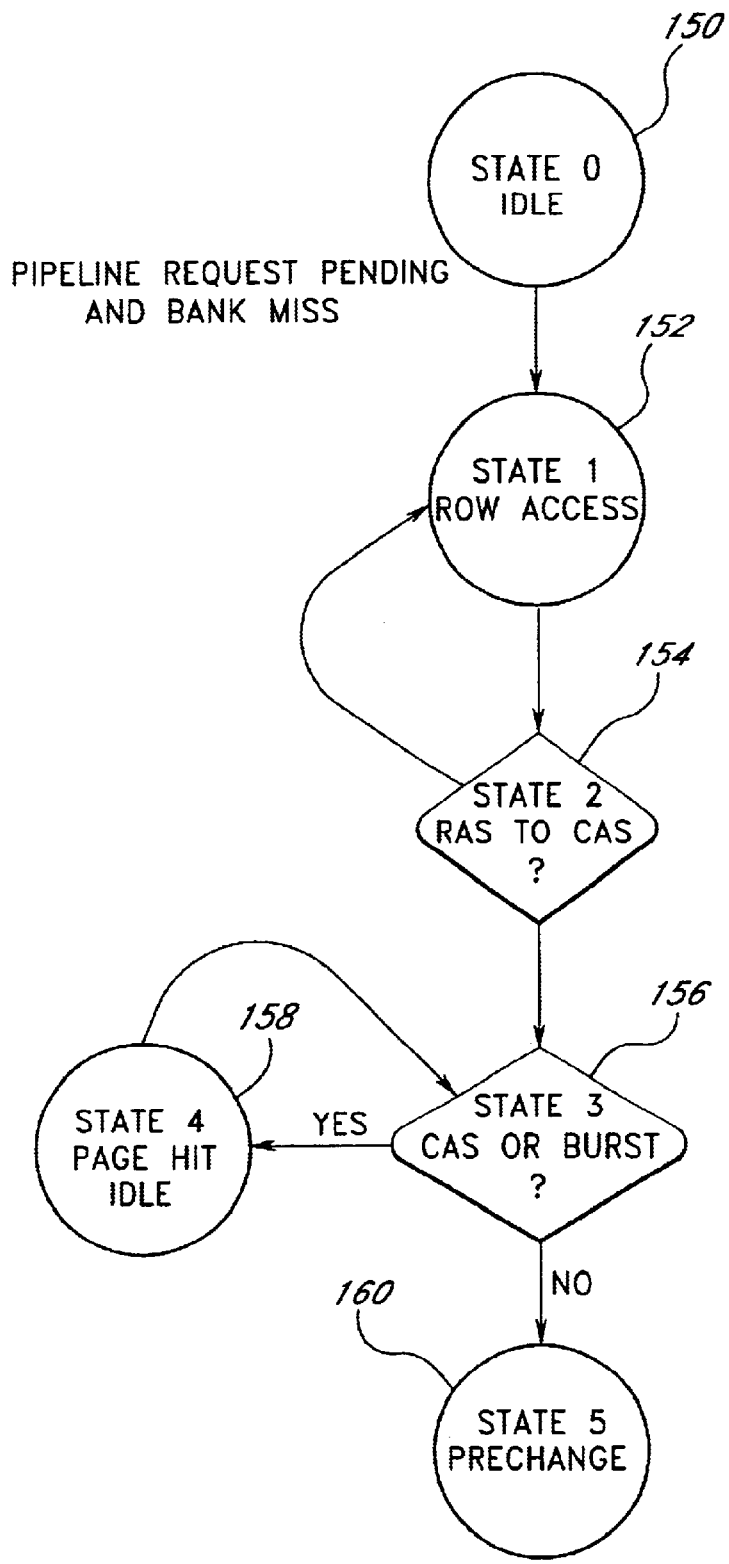
FIG. 10 is a state diagram illustrating the pipeline process for the state machine shown in FIG. 3.

FIG. 10 is a flow diagram illustrating the pipeline process for the state machine 66. Starting at a state 150, the state machine 66 is in an idle state waiting for a memory request. After receiving a memory request, the state machine 66 moves to a state 152 to send the row address to the memory module 12 of the memory referenced by the memory request. Next, at a decision state 154, the state machine 66 requests the memory module 12 to perform a column access.

If the memory reference was not in the memory banks 14, 16 of the memory module 12, the state machine 66 returns to state 152 to process further memory requests, if any. If the memory reference was in the memory banks 14, 16, the state machine 66 proceeds to a decision state 156. In this state, an active command may be used to open or activate a row in the memory banks 14, 16 for subsequent memory accesses. At decision state 156, if an active command was initiated, the state machine 66 determines whether the memory request was for burst access or whether there is a pipeline request for a memory cell in the same row as the previous request. If the memory request was for a burst access, the state machine 66 moves to a state 158 and waits for the data. On the other hand, if it is determined in state 156 that a row in the memory banks 14, 16 was made active, in the decision state 156 the state machine 66 processes all of the memory requests for the open row. Moving from the state 156, the state machine 66 moves to state 160 and activates the precharge command to deactivate any active rows in the memory module 12.

As is witnessed by the foregoing discussion, the pipeline of the invention increases memory throughput if several memory accesses are executed, one after the other. Based upon the foregoing discussion, it will be appreciated that the invention greatly reduces the number of memory access delays by pipelining the memory requests in the memory buffer 50. The invention allows three memory operations to be acted on concurrently. The invention provides the decode module 60, the memory address module 62, and the data transfer module 64 which can each perform the partial processing of a memory request during the same clock cycle. In a non-pipelined memory controller, each memory request waits for the completion of the previous memory request before being processed. However, using the modules 60–64, a second memory request can be processed before the completion of the processing of a first memory request. For example, once the decode module 60 has finished decoding the first memory request, the decode module 60 can start the decode process for the second memory request.

More significantly, the pipeline for the memory controller 18 is simply and cheaply implemented by using a set of rotational registers 52–58. The registers 52–58 are easily indexed by stages in a pipeline through the use of pointers. The state machine 66 simply updates the pointers for each of the modules 60–64 to step through each of the stages in the pipeline.

While the above detailed description has shown, described, and pointed out fundamental novel features of the invention as applied to various embodiments, it will be understood that various omissions and substitutions and changes in the form and details of the system illustrated may be made by those skilled in the art, without departing from the intent of the invention. The scope of the invention is indicated by the appended claims rather than by the foregoing description. All changes which come within the meaning and range of equivalency of the claims are to be embraced within their scope.

What is claimed is:

1. A method of processing at least one memory request, the method comprising:
   processing the at least one memory request in a plurality of stages, wherein in a first stage, the at least one memory request is received from a memory requester and stored in a request buffer, wherein in a second stage the at least one memory request is decoded, wherein in a third stage the at least one memory request is sent to a memory module, wherein during the act of processing, each of the first, second and third stages are executed in parallel, and wherein the act of processing includes the act of storing first and second memory requests in at least one rotational register contained in the request buffer; and
   assigning a decode pointer, an address pointer, and a data pointer to reference the register of the memory request that is being processed by an decode module, an address module and a data module, respectively.

2. The method as defined in claim 1, wherein during the act of processing, each of the first, second and third stages are executed during an identical number of clock cycles.

3. The method as defined in claim 1, wherein during the act of processing, each of the first, second and third stages are executed independently.

4. The method as defined in claim 1, wherein the act of processing further includes the act of determining what type of memory is being requested by the memory request.

5. The method as defined in claim 1, wherein the act of processing further comprises the act of determining which data bank of the memory module contains the data for the memory request.

6. The method as defined in claim 1, wherein the act of processing further comprises the act of determining an error correction method.

7. The method as defined in claim 1, wherein the act of processing further comprises the act of sending the row and column address of the memory request to the memory module.

8. A method of manufacturing a pipelined memory controller, comprising:
   connecting a request queue having a plurality of registers to a state machine; and
   coupling a data transfer module, a decode module and a memory address module to the state machine, each of the modules having a pointer which is configured to point to a memory request in the request queue.

9. A method of pipelining memory requests in a memory controller, comprising:
   storing a memory request in a first register;
   pointing a request pointer to the first register;
   pointing a decode pointer to the first register;
   pointing an address pointer to the first register;
   decoding the address of the memory request in the first register;
   sending the address of the memory request to a memory module;
   storing a second memory request in a second register;
   updating the request pointer to reference the second memory request;
   updating the decode pointer to reference the second memory request;
   updating the address pointer to reference the second memory request;
   decoding the address in the second memory address;
   incrementing the decode and address pointers;
   sending the address of the memory request to a memory module; and
   transferring the data requested by the first and second memory requests from the memory module to a data transfer module.

10. The method as defined in claim 9, further comprising the act of updating the decode pointer, the address pointer and the data pointer by a state machine at the beginning of each stage in a pipeline.

11. The method as defined in claim 9, wherein the act of transferring the data further includes the act of supplying a clock signal to a memory module.

12. The method as defined in claim 9, wherein each of the acts of storing further includes the act of storing the first and second memory requests in at least one rotational register.

13. The method as defined in claim 11, wherein each of the acts of decoding further includes the act of determining what type of memory is being requested by the memory request.

14. The method as defined in claim 11, wherein each of the acts of decoding further includes the act of determining which data bank of the memory module contains the data for the memory request.

15. The method as defined in claim 11, wherein each of the acts of decoding further includes the act of determining an error correction method.

16. A method of handling multiple memory requests, the method comprising:

receiving in a memory controller at least two memory requests for data that resides in a memory; and concurrently processing the two memory requests,
wherein the request buffer includes a plurality of registers and wherein the method further comprises assigning a decode pointer, an address pointer, and a data pointer to reference a register in the request buffer.

17. The method of claim 16, additionally comprising storing the at least two memory requests in a request buffer.

18. A computer system, comprising:

a memory module capable of storing digital information; and a memory controller, connected to the memory module, comprising:

a request buffer for receiving and storing multiple memory requests, a decode module having a pointer to the request buffer, an addressing module having a pointer to the request buffer, and a state machine capable of updating the pointer in the decode module and the addressing module, wherein the decode module, the decode module and the addressing module operate concurrently for at least selected time intervals.

19. A computer system, comprising:

a memory module capable of storing digital information; and a memory controller, connected to the memory module, comprising:

a request buffer for receiving and storing multiple memory requests, a decode module having a pointer to the request buffer, an addressing module having a pointer to the request buffer, and wherein the decode module and the addressing module operate concurrently for at least selected time intervals.

20. The computer system of claim 19, additionally comprising a state machine which is capable of updating the pointer in the addressing module and the decode module.

* * * * *